United States Patent
Carr et al.

(10) Patent No.: US 10,102,551 B2
(45) Date of Patent: Oct. 16, 2018

(54) METHODS AND SYSTEMS TO PROVIDE PRICE MATCHING OFFERS TO POTENTIAL CUSTOMERS

(71) Applicant: Wal-Mart Stores, Inc., Bentonville, AR (US)

(72) Inventors: David Jon Carr, Mountain View, CA (US); Richard Mark Ramsden, Foster City, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 155 days.

(21) Appl. No.: 14/136,507

(22) Filed: Dec. 20, 2013

(65) Prior Publication Data
US 2015/0178792 A1    Jun. 25, 2015

(51) Int. Cl.
| | | |
|---|---|---|
| *G06Q 30/00* | (2012.01) | |
| *G06Q 30/02* | (2012.01) | |
| *G06K 9/00* | (2006.01) | |
| *G06K 9/18* | (2006.01) | |

(52) U.S. Cl.
CPC ..... *G06Q 30/0276* (2013.01); *G06K 9/00469* (2013.01); *G06K 9/18* (2013.01); *G06Q 30/0255* (2013.01)

(58) Field of Classification Search
CPC .................................................. G06Q 30/0224
See application file for complete search history.

(56) References Cited

U.S. PATENT DOCUMENTS

| | | | | | |
|---|---|---|---|---|---|
| 5,956,693 | A | * | 9/1999 | Geerlings | G06Q 30/02 705/14.53 |
| 7,464,050 | B1 | * | 12/2008 | Deaton | G06Q 20/20 705/14.1 |
| 7,792,709 | B1 | * | 9/2010 | Trandal | G06Q 30/02 705/26.1 |
| 2003/0154125 | A1 | * | 8/2003 | Mittal | G06Q 30/0222 705/14.23 |
| 2004/0133435 | A1 | * | 7/2004 | Berlin | G06Q 30/00 705/26.1 |

(Continued)

OTHER PUBLICATIONS

Mori et al., "Historical Review of OCR Research and Development", Proceedings of the IEEE, 80:7 (Jul. 1992), 1029-1057.*

*Primary Examiner* — Kambiz Abdi
*Assistant Examiner* — Scott C Anderson
(74) *Attorney, Agent, or Firm* — Bryan Cave Leighton Paisner LLP

(57) ABSTRACT

Methods and systems for providing coupons to a customer are provided. The method may include a computer server associated with a store receiving, from a customer, an image of a receipt from a competing store. The server may identify a product on the receipt which was purchased by the customer at the competing store and a purchase price. The server may compare the product with a corresponding product sold by the store to determine if the product was purchased by the customer at the competing store for a lower price than a price at which the corresponding product is sold at the store. The server may prepare a coupon for the customer to offer the customer a discount for shopping at the store if the product was purchased by the customer at the competing store for a lower price and transmit the coupon to the customer.

20 Claims, 9 Drawing Sheets

(56) References Cited

U.S. PATENT DOCUMENTS

| | | | |
|---|---|---|---|
| 2008/0091552 A1* | 4/2008 | Aas | G06Q 30/0603 |
| | | | 705/26.3 |
| 2009/0299887 A1* | 12/2009 | Shiran | G06Q 40/00 |
| | | | 705/35 |
| 2013/0091002 A1* | 4/2013 | Christie | G06Q 30/02 |
| | | | 705/14.26 |
| 2013/0173372 A1* | 7/2013 | Misra | G06Q 30/0222 |
| | | | 705/14.23 |
| 2013/0311286 A1* | 11/2013 | Detwiler | G06Q 30/0255 |
| | | | 705/14.54 |

* cited by examiner

METHODS AND SYSTEMS TO PROVIDE PRICE MATCHING OFFERS TO POTENTIAL CUSTOMERS

BACKGROUND INFORMATION

Field of the Disclosure

The present invention relates to shopping. In particular, examples of the present invention relate to a system to allow a store to provide a price matching invitation for the customer to shop at the store.

Background

There are many benefits to using computer and internet technology; both for customers and for stores. Properly executed, internet technologies can provide additional venues for communicating with customer and can increase sales and revenue for a store. Many stores desire to use additional methods of contacting or interacting with potential customers to encourage these potential customers to purchase from the store.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
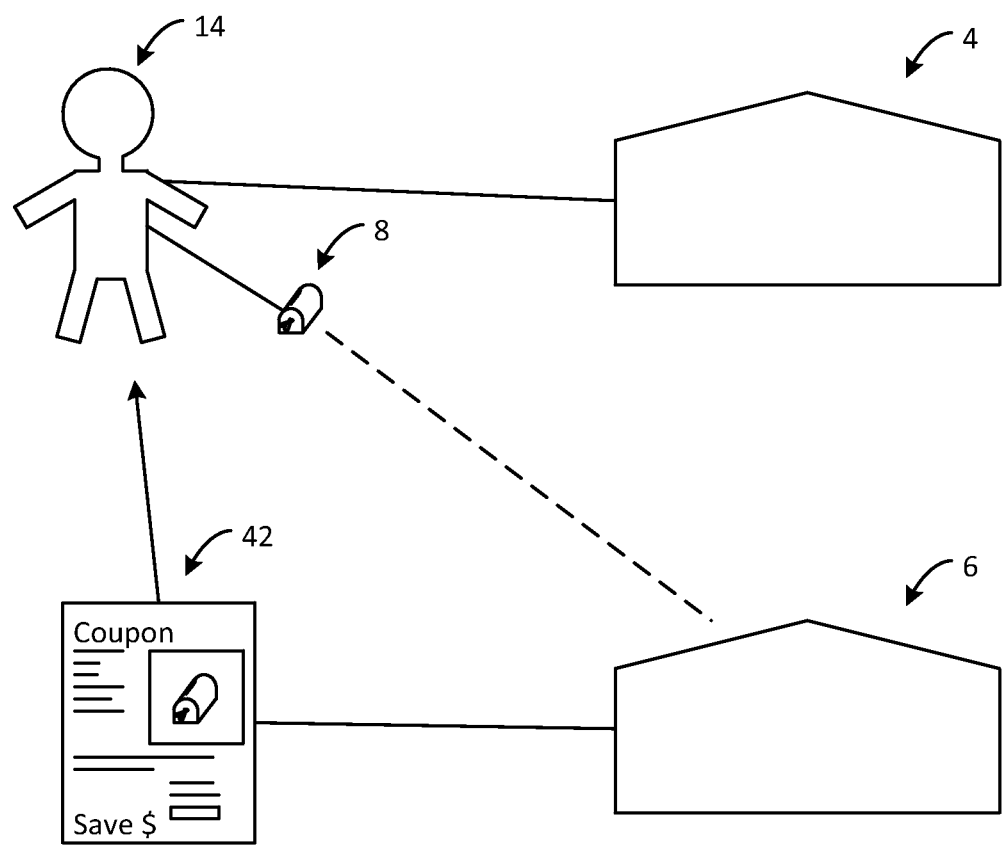
FIG. 1 is a schematic illustrating a computer system in context of a price matching module.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system". Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The disclosure particularly describes how to offer price matching offers to customers who have previously shopped at a different store. Particularly, the present disclosure describes how a computer system may be used to provide price matching offers or discounts to a customer based on receipt data obtained from the customer.

Many retailers desire to lure customers from competing stores. To this end, significant efforts are expended in comparative advertising, etc. There are, however, many customers who are unfamiliar with the store or who otherwise lack the time or motivation to begin shopping at a different store or utilize additional services or benefits provided by the store. These customers may benefit from additional enticements to shop at the store. These customers may also benefit from an easy way to obtain a discount or offer from the store which requires little effort on their part.

Referring to FIG. 1, a computer system is utilized to encourage customers to shop at a store 6. A customer 14 may currently shop at a competing store 4. The customer 14 may have purchased an exemplary item 8 at the competing store 4. The store 6 is the primary subject of the present disclosure and is frequently referred to simply as a store or the store in contrast to the store 4 being referred to as a competing store or another store. The store 6 may desire to attract the customer 14 and encourage the customer 14 to shop at the store 6. To this end, the store 6 may provide an advertisement or offer to the customer 14 to compare prices between the store 6 and the competing store 4 and, if the customer 14 purchased an item 8 at the competing store 4 at a lower price, offer a discount or coupon 42 to the customer to entice the customer 14 to shop at the store 6.

The store 6 may provide the coupon 42 to the customer 14 in a manner which is convenient and which does not require any significant amount of the customer's time to compare prices or to seek or redeem the price difference. The store 6 computer system may also encourage the customer 14 to utilize customer accounts at the store 6 and receive further benefits from maintaining a customer account, online shopping, etc. A customer 14 may create an account with the store to utilize additional shopping features.

The store computer system may receive shopping receipts from a customer. The computer system may process the receipts and analyze the purchases made by the customer. The computer system may determine what types of products the customer has purchased and determine if the customer 14 has purchased those products at a competing store 4 at a lower price than that offered by the store 6. The computer system may then utilize customer purchase information from the competing store 4 and pricing information from the store 6 to prepare and provide a coupon 42 to the customer. As the customer 14 utilizes the computer system to receive the discount 42, the store 6 may receive pricing information from the competing store 4 and use this pricing information to update their own pricing strategies to provide the best value to the customer 14.

Particularly, the store 6 may invite the customer 14 to send an image of a receipt (26) from the competing store 4 to the store 6 to compare prices and automatically issue a coupon or discount 42 to the customer 14 if the customer purchased an item 8 from the competing store 4 at a lower price. The customer 14 may easily capture an image (picture) of a receipt 26 from a competing store 4 with a computer 18 such as a mobile electronic device and use the same computer to send the receipt image to the server 10. A server at the store 6 may use optical character recognition to identify items on the customer receipt and to identify information regarding those items from the receipt. The server may identify an item UPC code and price from the receipt. The server may then compare item UPC codes and prices against items sold by the store 6. If one or more items from the receipt we purchased at a lower price at the competing store 4, the store 6 may issue an electronic coupon to the customer 14 to encourage the customer to shop at the store 6.

Figure 2:
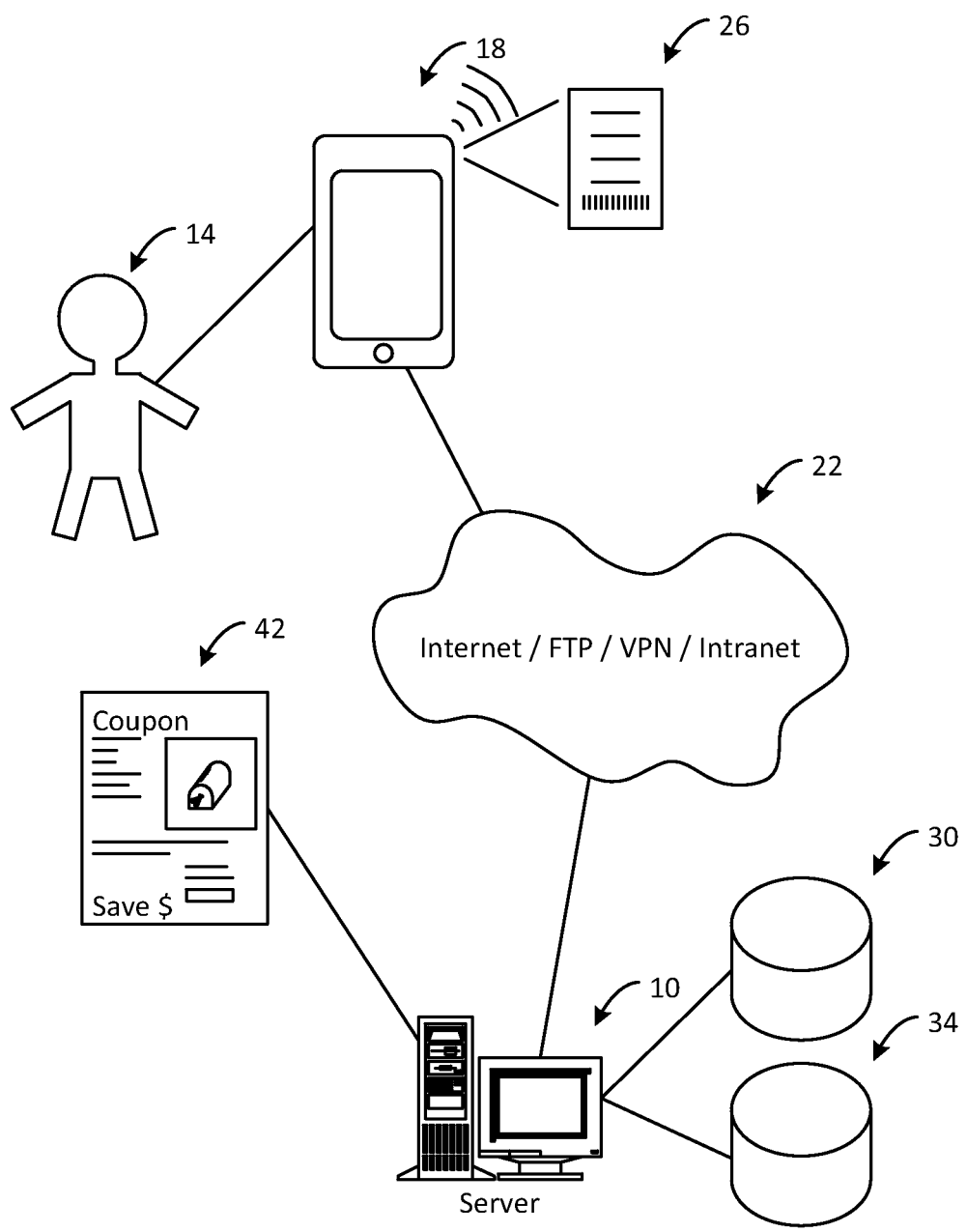
FIG. 2 is a schematic illustrating additional aspects of the computer system.

Referring to FIG. 2, a store computer system may include a server 10 or other computer associated with a store. The server 10 may facilitate the collection and presentation of information to a customer 14 in the process of interacting with the customer during comparative shopping experiences. The server 10 may communicate with the customer 14 via another computer 18 and via the internet 22 or other communication systems.

The computer system may also include other computing devices. Particularly, the system may include a computer 18 associated with the customer 14. The computer 18 may be one of a variety of different electronic devices such as a smart phone, tablet computer, laptop, personal computer, etc. The customer 14 may use a computer 18 to provide information to the server 10 and to receive information from the server 10 in the context of comparative shopping with the store 6 and in receiving a coupon 42 from the store. The store 6 (i.e. via server 10) may instigate an advertising campaign to encourage customers to compare prices between the store 6 and a competing store 4 and, if the competing store 4 had a cheaper price, receive a discount while shopping at the store 6. Thus, the server 10 may initiate a campaign to as if customers 14 are "SHOPPING ELSEWHERE CHEAPER? COME TO US AND WE WILL MATCH THE DIFFERENCE." Such an advertising campaign may initially be presented to potential customers 14 via television, the internet, etc. and in some examples, present the information via computer 18.

The computer 18 may be used to send receipt information associated with one or more shopping receipts 26 (from a competing store 4) to the server 10. The server 10 may receive information regarding the various receipts 26 and may process or analyze the information. The server 10 may query a product database 30 in analyzing the receipts 26. The product database 30 may include product information. The product database 30 may include product UPC codes, prices, descriptions, etc. The server 10 may analyze the receipt(s) 26 against the product database 30 to compare purchase information associated with the customer 14. Particularly, the server 10 may allow the customer to send an image of a receipt 26 (i.e. a picture of the receipt) from a competing store 4 and may process the receipt image to determine if a price savings was obtained at the competing store.

The server 10 may store customer data. The server 10 may store information regarding the customer 14 and regarding customer preferences in the context of a customer account created by the customer. The server 10 may thus store contact information for the customer 14 (or for the electronic device 18 used by the customer and associated with the customer account). The server 10 may also store customer purchase history and purchase information associated with the customer 14. Such information may be stored in a customer database 34.

The server 10 may use information from the receipt 26 and from the product database 30 to determine if the customer purchased an item for less at the competing store 4 and, if necessary, provide a coupon 42 to the customer. The server 10 may use customer information from the customer database 34 to provide such a coupon 42 to the customer 14. The coupon 42 may be provided in the context of a discount reflecting the pricing difference on the item purchased by the customer and may be redeemed for simply shopping at the store 6.

The server 10 may be connected to the internet 22 via a modem, router, or the like. Similarly, the electronic device/computer 18 may be connected to the internet via a wired or wireless router when such a connection is available. The electronic device 18 may also be connected to the internet via a cellular network to provide communications when the device 18 is not in communication range of a wireless router or the like.

The software, hardware, and associated components of a computer system may be programmed and configured to implement one or more embodiments described herein. Customers 14 may communicate with a store server 10 via a computer 18 and a network connection or internet connection 22 to transmit receipt information to the server 10 and to receive a coupon 42 from the server 10. Particularly, the computer 18 may receive a coupon 42 which is specific to the customer purchase history at a competing store 4.

To participate in online or computer assisted shopping with the store, customers 14 may be invited to create an account with the server 10. Customers 14 who desire a store account will create an account with the server 10 and provide customer information such as identifying information, password information, contact information, etc. The server 10 may store customer information in a record associated with the customer 14 in a customer database 34. In creation of a customer account, the server 10 may present the benefits or advantages associated with the customer account to encourage the customer 14 to create a customer account and continue shopping at the store 6.

Figure 3:
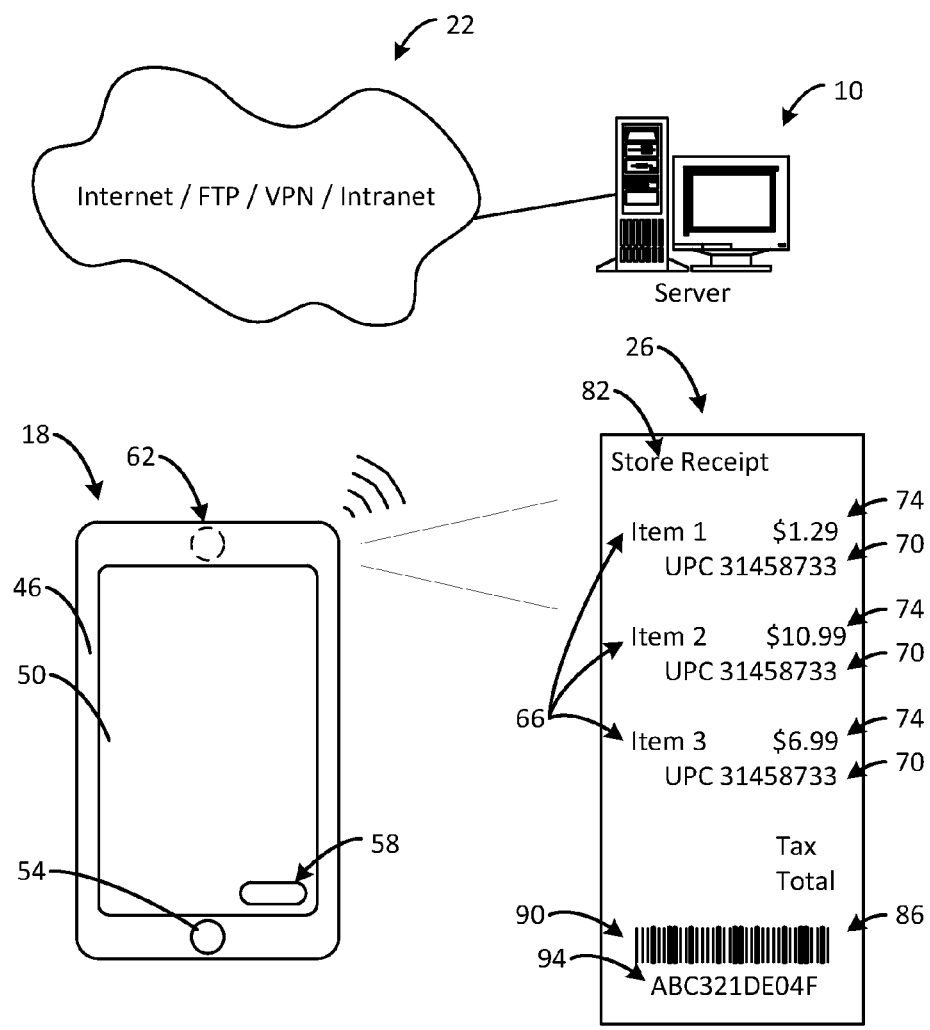
FIGS. 3, 4, and 5 are schematics illustrating various aspects of the computer system.

Referring to FIG. 3, the computer 18 (smart phone, tablet computer, laptop, desktop computer, etc.) typically includes a body or case 46 which houses internal electronics such as a processor, memory, battery, wireless communications device, etc. The computer 18 includes a user interface such as screen 50. Typically, the screen 50 is a display screen which presents information to a user and, in many instances, may also be a touch screen which accepts inputs from a user to allow the user to control the computer 18. The computer 18 may include various hardware buttons 54 which allow a user to operate the device, navigate through menus, etc. The computer 18 may include various software buttons 58 which allow a user to select software, change software or hardware settings, etc. The computer 18 may also include a camera 62. The various components of the computer 18 allow the computer 18 to perform the functions and display the data discussed herein.

The customer 14 may use the computer 18 to transmit receipt information to the server 10. The customer may be in possession of various receipts 26 from another store 4. Each receipt 26 may include different pieces of information. An example receipt 26 may include information about one or more items 66 which were purchased as part of the transaction which generated the receipt 26. The receipt 26 may also show a UPC code 70 associated with the item 66. A UPC code 70, also known as a universal product code, is a code (numeric or machine readable) which identifies a product. The UPC code 70 is typically a universal code which will identify one item even among different stores. The receipt 26 may also display the price 74 of the item(s) 66. The receipt 26 will typically display the date 78 upon which the purchase transaction was completed.

The receipt 26 may also identify the store 82 where the purchase was made. For many stores, a receipt 26 may have a transaction identification code 86 (transaction ID) associated with the particular purchase transaction. The identification code 86 may be presented as a machine readable code 90, an alphanumeric code 94, or both.

The customer 14 may use the computer 18 to transmit information regarding the receipt 26 to the server 10. The server 10 may be programmed to receive an image of a receipt 26. The customer may use a camera 62 on the computer 18 to capture an image of the receipt 26 and transmit the receipt image to the server 10. A price matching module on the computer 18 may transmit the image of the receipt 26 to the server 10.

Figure 4:
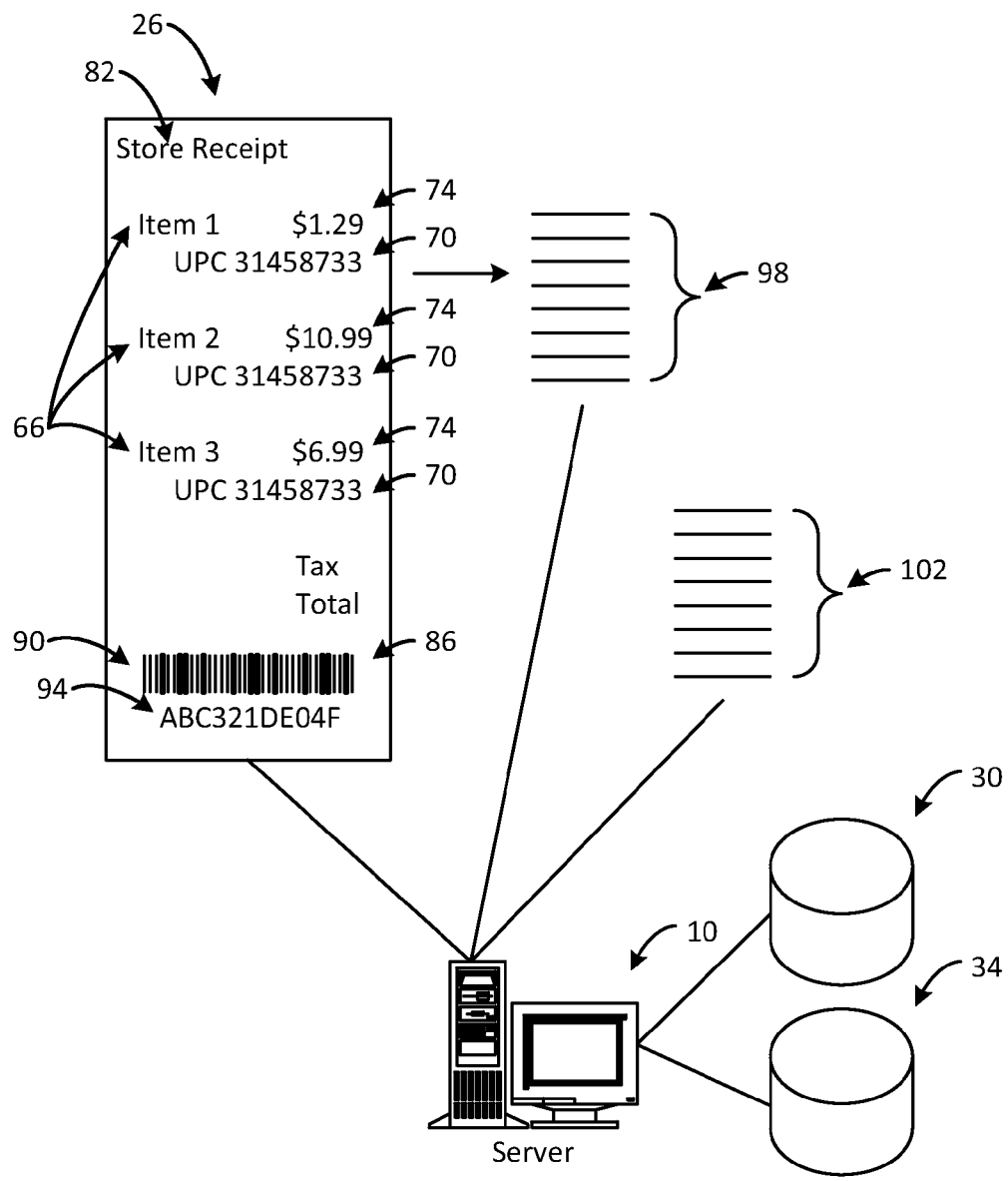

Referring now to FIG. 4, the server 10 may process one or more receipts 26 provided by the customer 14. While a single computer 18 or server 10 are shown, the functionality of that device may be accomplished with multiple computer devices working together. For example, it may be desirable to have multiple servers/computers 10 handling the functionality discussed with respect to server 10. Additionally, the server 10 may interface with multiple customers 14 and multiple electronic devices 18 in the manner discussed herein.

The server 10 may be programmed to identify data fields in the receipt 26 and extract relevant data from the receipt. The server 10 may process a receipt 26 with an ordered approach to retrieve receipt data. The server 10 may identify another store 82 (i.e. exemplary store 4) which is associated the receipt 26. The server 10 may process the receipt image 26 via optical character recognition (OCR). The server 10 may retrieve transaction information from the receipt 26, including the items 66 and item names, UPC codes 70, prices 74, date 78, etc. associated with the receipt. As UPC codes 70 are associated with the item 66 and not with the particular store, the server 10 may retrieve product information from a receipt from a different store by retrieving the UPC code and identifying the product.

The server 10 may thus extract receipt data 98 from the receipt(s) 26 which have been provided by the customer 14. The server may query the product database 30 to obtain additional product information from the receipt data 98. In one example, the product database 30 may contain information for products sold by the store 6. The server 10 may thus identify products on the receipts 26 which are sold by the store and may analyze those products as discussed.

In another example, the product database 30 may contain information for a much larger range of products which are not sold by the store 6. The product database 30 may contain product information for products which are similar or analogous to products sold by the store. Thus, the server 10 may analyze the receipt data 98 to identify both products sold by the store and products which are similar to those sold by the store. These products may be a different brand, etc. than a similar product sold by the store, such as a different brand of white bread. In this example, the product database 30 may contain some item description for each product and the server 10 may analyze products identified by UPC in a receipt 26 which are not sold by the store to determine if the store sells an equivalent product.

The server 10 may analyze receipt data 98 extracted from multiple receipts 26 and calculate customer purchase data 102. As an example, the server 10 may create a customer account associated with a customer 14 and may create a database record for the customer 14 which may be saved in a customer database 34 along with any available customer profile, preference, and contact information associated with the customer 14. In determining customer purchase data 102, the server 10 may correlate receipt purchase items 66 with identical or equivalent (i.e. different brand of the same type of item) items in a product database 30 associated with the store 6. The server may use OCR recovered UPC codes 70 from the receipt and, for a particular item 66 or item UPC code 70, determine if a price difference exists between the store 6 and the competing store 4. The server 10 may determine when an item 66 was purchased from a competing store 4 at a lower cost than the item is available at the store 6 and prepare a coupon 42 for the customer which reflects the difference in item cost.

As mentioned, the server 10 may determine a genus of an item type (e.g. bread or white bread) for different species of item purchases (e.g. particular brands of white bread). The server 10 may then, for a particular genus of item, determine if a price difference exists between the store 6 and competing store 4 for different species of the same genus of item. For many items like bread or milk, the customer may purchase different brands of the item depending on what is available at a particular store and the type of item is of greater significance than the exact brand of the item. For other items, such as disposable razor cartridges, any comparison is more relevant to a particular species of item (i.e. the same brand and type of razor cartridge in the same quantity package). As with each of these example items, the server 10 may compare item purchases made by the customer 14 at a competing store 4 with items available at the store 6 and, where the item was cheaper at the competing store 4, issue a coupon 42 to the customer 14 for the difference in cost. This information may be saved as purchase data 102 by the server 10.

The server 10 may save the purchase data 102 in a database record associated with the customer 14 in the customer database 34. Additionally, the server 10 may save or associate purchase data with the competing store 4. The server 10 may use information regarding purchases at a competing store 4 to adjust prices at the store 6. In this manner, the store 6 may obtain additional information regarding competing stores 4 to ensure that the store 6 offers the best prices to its customers 14. This helps retain customers 14 who try the store 6.

The server 10 may combine/merge all of the receipt data 98 and purchase data into a single database record for each particular customer 14. The server 10 may merge information based on customer account numbers or contact number (such as a telephone number associated with an electronic device 18). The final dataset (i.e. a database record) may be stored on the server 10. Items 66 purchased by the customer 14 at competing stores 4 may also be associated with the competing store 4 within the server.

Figure 5:
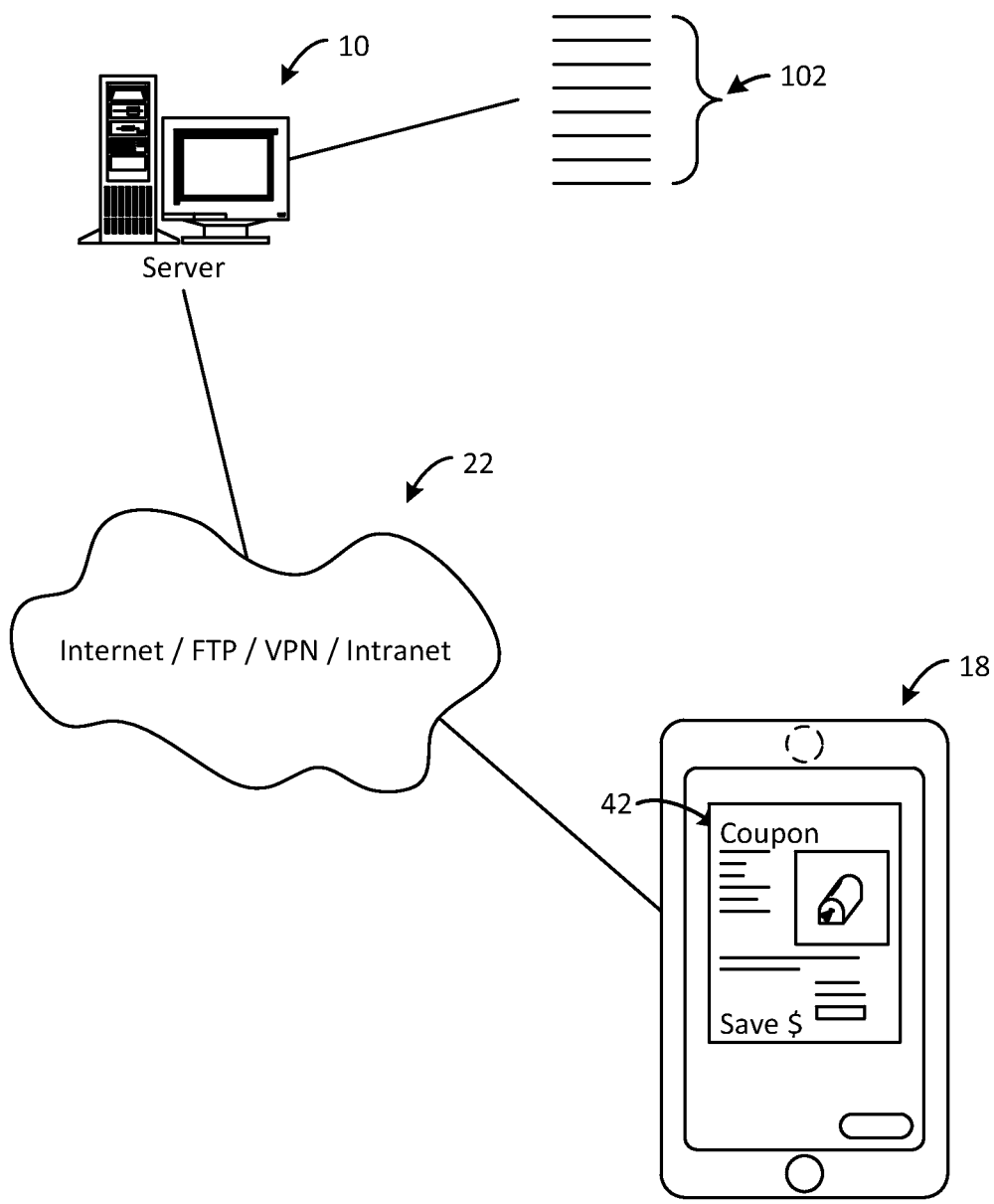

Referring now to FIG. 5, the server 10 may utilize the customer purchase data 102 to create coupons which are specific to the customer 14. Particularly, the server 10 may use purchase data 102 regarding prior purchases at a competing store 4 to create a coupon 42 for the customer to suggest shopping at the store 6. The server 10 may present the coupon 42 to the customer on the electronic device 18.

As an example, the coupon 42 may be presented to the customer 14 as an internet webpage, window, or notification and may be presented to the customer via a computer 18 which may be a mobile electronic device. The server 10 may present the coupon 42 to the same computer 18 which was used to transmit the coupon image 26 to the server 10 if the customer 14 does not provide a different method of delivery for the coupon 42.

As an example, the coupon 42 may be displayed as a message or notification on a mobile electronic device 18. Where the electronic device 18 is mobile such as a smart phone or a tablet computer, the server may transmit a text notification 42, pop-up window notification, etc. A customer 14 may typically bring that device 18 with them when shopping at a brick and mortar store location and may use an alpha-numeric or machine readable code which is part of the coupon 42 to redeem the coupon while shopping at the store 6.

Figure 6:
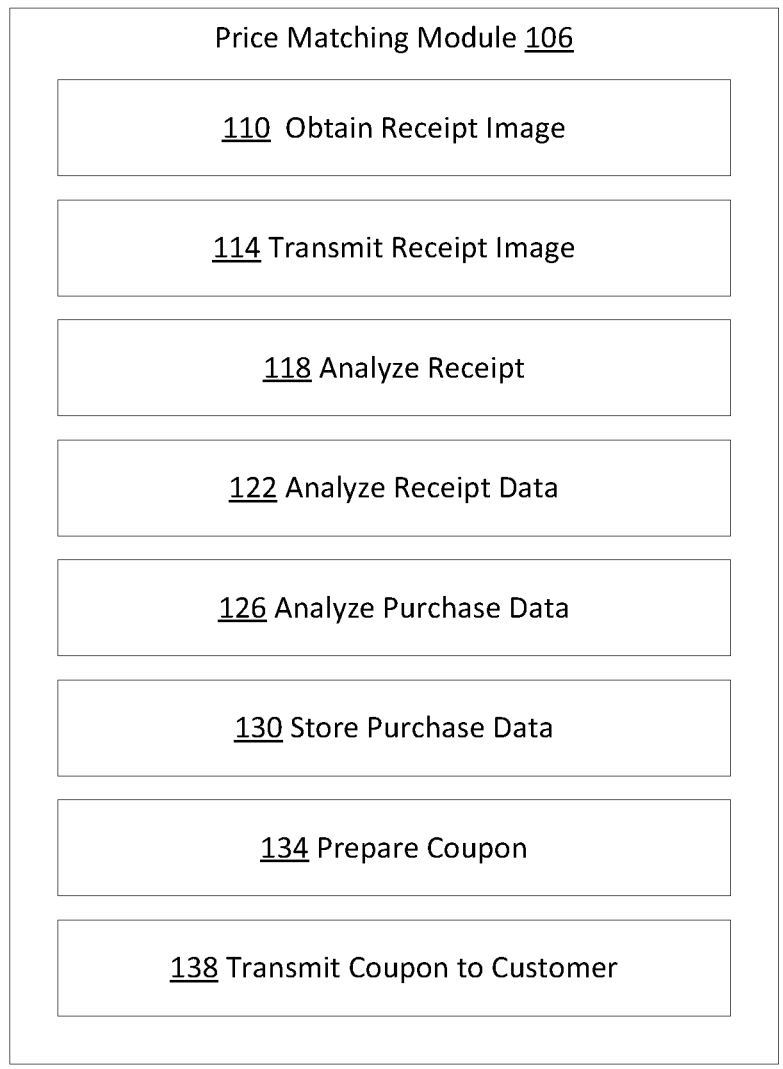
FIG. 6 shows a diagram of the price matching module.

Referring now to FIG. 6, a price matching module 106 may execute one or more of the steps discussed herein. The price matching module 106 may be stored and may operate on the server 10, on the electronic device 18, or on both the server 10 and electronic device 18. As discussed, the price matching module 106 may obtain 110 a picture of a receipt or may otherwise obtain information sufficient to identify a receipt and associated transaction within the server 10. The price matching module 106 may transmit 114 the receipt image to the server 10. The price matching module 106 may analyze 118 the receipt 26 to extract receipt data from the receipt. The price matching module 106 may then analyze 122 the receipt data to determine customer purchase data, and may also analyze 126 the purchase data to determine if the customer purchased an item at a competing store 4 at a lower price than at the store 6. The price matching module 106 may then store 130 the customer purchase data, in association with a customer account or with the customer. The price matching module 106 may then prepare 134 a coupon 42 for the difference in item prices and may transmit 138 a coupon 42 to the customer 14.

Figure 7:
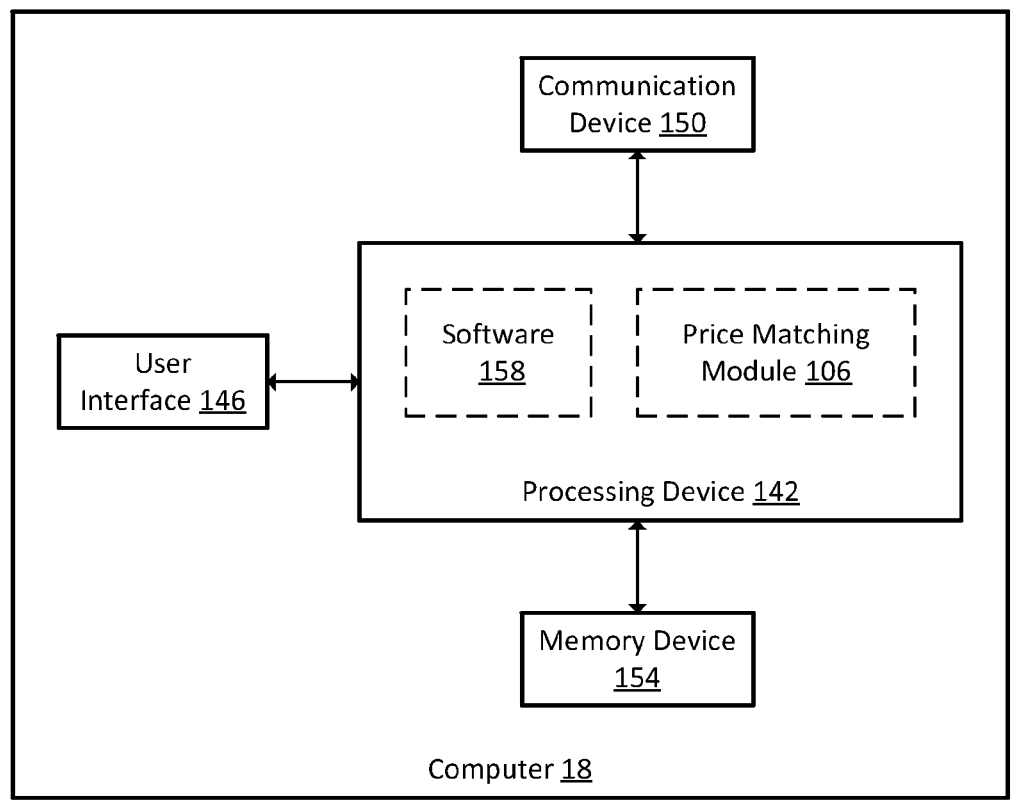
FIG. 7 is a schematic illustrating example components of the mobile electronic device or computer.

Referring now to FIG. 7, a schematic illustrating example components of the computer 18 is shown. As discussed, the computer 18 may be a smart phone, tablet computer, laptop computer, desktop computer, etc. Frequently, the computer 18 will be a smart phone or tablet computer which is capable of receiving and displaying internet data, messages, and webpages. The computer 18 includes a processing device 142, a user interface 146, a communication device 150, and a memory device 154. It is noted that the computer 18 can include other components and some of the components are not required.

The processing device 142 can include memory, e.g., read only memory (ROM) and random access memory (RAM), storing processor-executable instructions and one or more processors that execute the processor-executable instructions. In embodiments where the processing device 142 includes two or more processors, the processors can operate in a parallel or distributed manner. The processing device 142 can execute the operating system of the computer 18. In one example, the processing device 142 may also executes a software module 158 and a price matching module 106.

The user interface 146 is a device that allows a user, a customer in particular, to interact with the computer 18. While one user interface 146 is shown, the term "user interface" can include, but is not limited to, a touch screen, a physical keyboard, a mouse, a camera, a microphone, and/or a speaker. The communication device 150 is a device that allows the computer 18 to communicate with another device, e.g., the server 10. The communication device 150 can include one or more wireless transceivers for performing wireless communication and/or one or more communication ports for performing wired communication. The memory device 154 is a device that stores data generated or received by the computer 18. The memory device 154 can include, but is not limited to, a hard disc drive, an optical disc drive, and/or a flash memory drive.

The price matching module 106 allows a user, a customer in particular, to transmit receipts 26 to and receive a coupon 42 from a server 10. The price matching module 106 also allows the computer 18 to execute one or more tasks as discussed herein.

Figure 8:
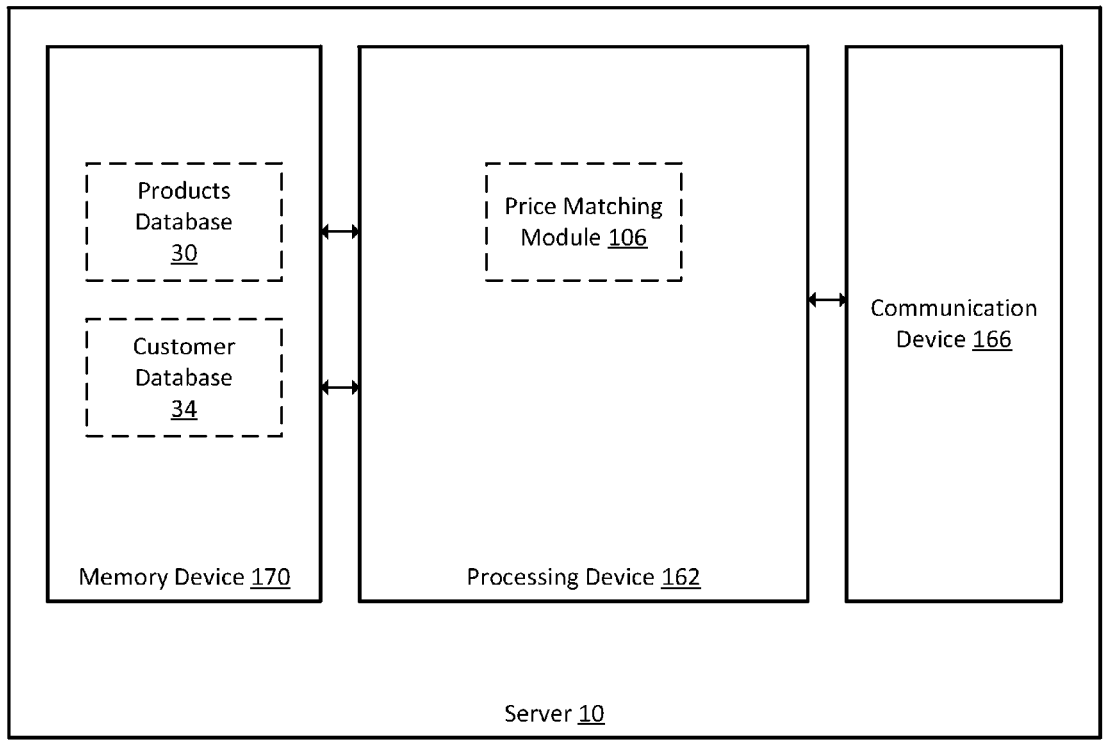
FIG. 8 is a schematic illustrating example components of a server.

The server 10 may be programmed to perform one or more functions at the request of the computer 18 and, according to various computing models, may execute some or all of the functions associated with operation of the price matching module 106. FIG. 8 illustrates an example embodiment of a server 10 which is programmed to perform one or more of the requested functions. The server 10 may include a processing device 162, a communication device 166, and a memory device 170.

The processing device 162 can include memory, e.g., read only memory (ROM) and random access memory (RAM), storing processor-executable instructions and one or more processors that execute the processor-executable instructions. In embodiments where the processing device 162 includes two or more processors, the processors can operate in a parallel or distributed manner. In the illustrative embodiment, the processing device 162 executes a price matching module 106. The price matching module 106 may execute, process, or facilitate internet communications, receipt data, purchasing data, a database, coupons, etc. as discussed herein.

The communication device 166 is a device that allows the server 10 to communicate with another device, e.g., the computer 18. The communication device 166 can include one or more wireless transceivers for performing wireless communication and/or one or more communication ports for performing wired communication.

The memory device 170 is a device that stores data generated or received by the server 10. The memory device 170 can include, but is not limited to a hard disc drive, an optical disc drive, and/or a flash memory drive. Further, the memory device 170 may be distributed and located at multiple locations. The memory device 170 is accessible to the processing device 162. In some embodiments, the memory device 170 stores data such as a products database 30 and a customer database 34.

In some embodiments, the products database 30 can store information associated with products such as product UPC codes, descriptions, prices, etc. The product database 30 may be queried by the processing device 162 and may provide information to the processing device to facilitate the processing of receipts and the creation of coupons 42.

The customer database 34 may store information regarding specific customers, such as customer account information, customer contact information and preferences, customer coupon history and habits, etc. The customer database 34 may be queried by the processing device 162 and may transmit information to the processing device to facilitate the creation of coupons 42 for the customer. In this manner, the processing device 162 may execute the price matching module 106 to receive and process receipt images 26, receipt data 98, customer purchase data 102, and coupons 42.

Figure 9:
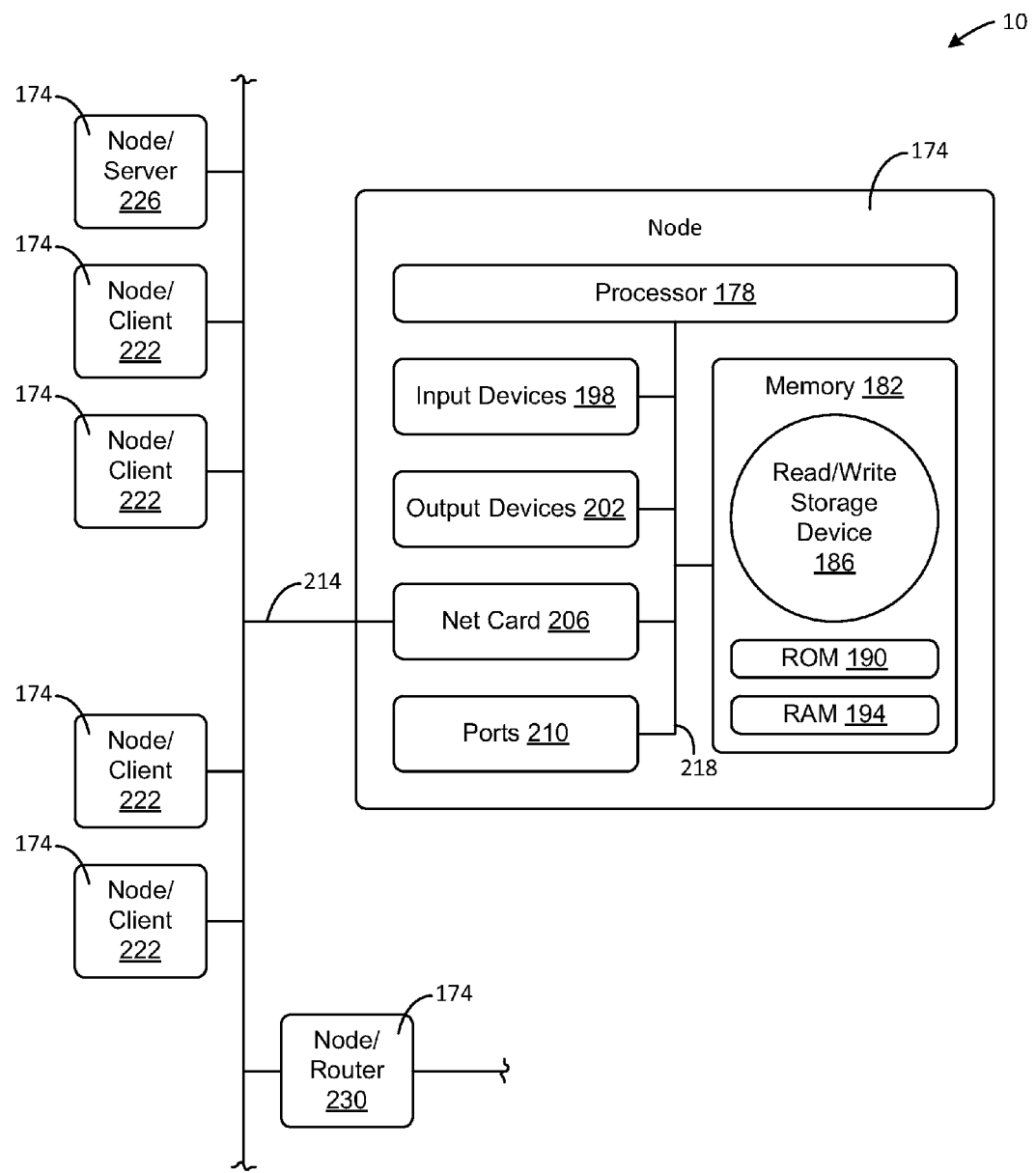
FIG. 9 is another schematic illustrating example components of a server.

Referring now to FIG. 9, an example node map illustrating how a server 10 may be implemented in different manners is shown. A server 10 in accordance with the present invention may provide, enable, or support the processing of receipts 26 and the execution of a price matching module 106 in any suitable manner. In certain embodiments, a server 10 may be embodied as hardware, software, or some combination thereof. For example, in selected embodiments, a server 10 may include one or more nodes 174.

A node 174 may include one or more processors 178 or central processing units (CPUs) 178. A node 174 may also include memory 182. Such memory 182 may be operably connected to a processor 178 and include one or more devices such as a hard drive 186 or other non-volatile storage device, read-only memory (ROM) 190, random access memory (RAM) 194, or the like or a combination or sub-combination thereof. In selected embodiments, such components may exist in a single node 174. Alternatively, such components may be distributed across multiple nodes 174.

In selected embodiments, a node 174 may include one or more input devices 198 such as a keyboard, mouse, touch screen, scanner, memory device, communication line, and the like. A node 174 may also include one or more output devices 202 such as a monitor, output screen, printer, memory device, and the like. A node 174 may further include a network card 206, port 210, or the like to facilitate communication through a computer network 214. Internally, one or more busses 218 may operably interconnect various components of a node 174 to provide communication therebetween. In certain embodiments, various nodes 174 of a server 10 may contain more or less of the components described hereinabove.

Different nodes 174 within a server 10 may perform difference functions. For example, one or more nodes 174 within a server system 10 may function as or be clients 222. Additionally, one or more nodes 174 within a system 10 may function as or be servers 226 Accordingly, a server system 10 may include one or more server nodes 226 or the like serving files, data, applications, etc. to one or more clients 222 connected thereto. A server 10 may also include one or more nodes 174 that function as or are routers 230 and the like. Accordingly, one computer network 214 may be connected to other computer networks via one or more routers 230.

The computer system is advantageous as it does not require any additional hardware to implement. The system can be implemented on an existing store server 10 and utilizing resources such as electronic devices 18 already possessed by customers 14. The computer system may be implemented on existing electronic devices 18 with only software. With minimal cost to implement the system, customers may be encouraged to compare prices and shop at a store 6 and may be further encouraged to create an account with the store 6 and continue shopping at the store. The customer may benefit by receiving the lowest price on purchased items. The store 6 may benefit from the increased revenue that comes from customer purchases resulting from the coupons 42. The store 6 may also benefit from receiving information about prices at a competitor store 4 with virtually no cost associated with the information.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A computer implemented method comprising:
providing an application to a customer for installation on a customer computer;
providing a computer server associated with a brick and mortar store and communicatively coupled to the application, the computer server comprising at least one processor and a memory;
providing a scanner within the brick and mortar store communicatively coupled to the computer server;
providing a product database stored on the memory of the computer server;
receiving from the application, by the computer server, an image of a receipt from a competing store, wherein the at least one processor of the computer server is configured to:
process the image of the receipt using optical character recognition;
identify a first UPC code of a plurality of UPC codes associated with a first product on the receipt to thereby identify the first product on the receipt which was purchased by the customer at the competing store;
query the product database to identify a corresponding product sold by the brick and mortar store associated with the first UPC code associated with the first product on the receipt, wherein the product database stores a plurality of product information for products sold at the brick and mortar store comprising the plurality of UPC codes, a plurality of product descriptions, and customer purchase data for each of the plurality of UPC codes;
identify, from the receipt, a price at which the first product was purchased at the competing store;
compare at least the first product, the price, and the first UPC code to the product database to determine whether the corresponding product is sold by the brick and mortar store and whether one or more other products of a brand of the first product is sold by the brick and mortar store;
when the corresponding product is not sold by the brick and mortar store, use a first product description of the plurality of product descriptions associated with the first UPC code of the first product to query the product database to identify the one or more other products of the brand of the first product sold by the brick and mortar store;
analyze the first product description associated with the first UPC code of the first product to determine whether the brick and mortar store sells one or more other brands of the first product, wherein the one or more other brands of the first product has a UPC code distinct from the first UPC code of the first product;
determine a genus and each species of the corresponding product and the one or more other brands of the first product;
when the brick and mortar store sells the corresponding product, determine whether a price difference exists between the competing store for the first product and the brick and mortar store for the each species of a same genus of the corresponding product;
when the brick and mortar store sells the one or more other brands of the first product, determine whether a price difference exists between the competing store for the first product and the brick and mortar store for the one or more other brands of the first product;
when the brick and mortar store sells the corresponding product or the one or more other brands of the first product, determine whether the genus or the each species of the corresponding product or the one or more other brands of the first product is of greater significance to the customer by (a) using the customer purchase data for the corresponding product and the one or more other brands of the first product and (b) comparing product purchases of the first product on the receipt made by the customer at the competing store with product purchases of at least one of the corresponding product or the one or more other brands of the first product made by the customer at the brick and mortar store;
when the brick and mortar store sells the corresponding product or the one or more other brands of the first product, compare the first product with the corresponding product or the one or more other brands of the first product to determine that the first product was purchased by the customer at the competing store for a lower price than a price at which the at least one of the corresponding product or the one or more other brands of the first product is sold by the brick and mortar store;
when the first product was purchased by the customer at the competing store at the lower price, prepare a coupon based on the determination of whether the genus of the each species of the corresponding product or the one or more other brands of the first product is of greater significance to the customer, the coupon offering a discount for shopping at the brick and mortar store which is equal to a price difference between the price at which the first product was purchased by the customer at the competing store and the price at which the at least one of the corresponding product or the one or more other brands of the first product is sold at the brick and mortar store; and
format the coupon into a notification, wherein the coupon includes a machine-readable code;
create a second coupon based on the customer purchase data from prior purchases at the competing store specific to the customer, wherein the second coupon is formatted into a second notification, wherein the second coupon includes a second machine-readable code;
transmitting the notification by the computer server over a wireless communication channel to the customer computer, wherein the notification comprises a pop-up window;
generating, by the computer server, a user interface of the application for display on the customer computer, the user interface including the pop-up window;
displaying the coupon and the second coupon to the customer on the user interface; and
scanning, by the scanner, the machine-readable code to allow the customer to redeem the coupon for purchasing the corresponding product or the one or more other brands of the first product at the brick and mortar store and to adjust the price of the at least one of the corresponding product or the one or more other brands of the first product at the brick and mortar store by the coupon.

2. The method of claim 1, wherein use the first product description associated with the first UPC code of the first product to query the product database to identify the one or more other brands of the first product further comprises:

querying the product database for the products matching the genus of the first product, and identifying one or more products matching the genus of the first product but having a different species than a species of the first product.

3. The method of claim 2, wherein the genus of the first product is a type of the first product.

4. The method of claim 2, wherein the species of the first product is a brand of the first product.

5. The method of claim 2, wherein the species of the first product is a brand of the first product, and one or more characteristics associated with the first product.

6. The method of claim 2, wherein the species of the one or more products is one or more brands of the one or more first products, and one or more characteristics associated with each of the one or more first products.

7. The method of claim 1, further comprises providing an invitation to the customer to create an account with the brick and mortar store.

8. A computer implemented method comprising:
providing an application to a customer for installation on a customer computer;
providing a computer server associated with a brick and mortar store and communicatively coupled to the application, the computer server comprising at least one processor and a memory;
providing a scanner within the brick and mortar store communicatively coupled to the computer server;
providing a product database stored on the memory of the computer server;
receiving from the application, by the computer server, a receipt from a competing store, wherein the at least one processor of the computer server is configured to:
receive a picture of the receipt from the competing store as an image;
process the image using optical character recognition;
identify a first UPC code of a plurality of UPC codes associated with a first product on the receipt to thereby identify the first product on the receipt which was purchased by the customer at the competing store;
query the product database to identify a corresponding product sold by the brick and mortar store associated with the first UPC code associated with the first product on the receipt, wherein the product database stores a plurality of product information for products sold at the brick and mortar store comprising the plurality of UPC codes, a plurality of product descriptions, and customer purchase data for each of the plurality of UPC codes;
identify, from the receipt, a price at which the first product was purchased at the competing store;
compare at least the first product, the price, and the first UPC code to the product database to determine whether the corresponding product is sold by the brick and mortar store, and whether one or more other products of a brand of the first product is sold by the brick and mortar store;
when the corresponding product is not sold by the brick and mortar store, use a first product description of the plurality of product descriptions associated with the first UPC code of the first product to query the product database to identify the one or more other products of the brand of the first product sold by the brick and mortar store;
analyze the first product description associated with the first UPC code of the first product to determine whether the brick and mortar store sells one or more other brands of the first product, wherein the one or more other brands of the first product has a UPC code distinct from the first UPC code of the first product;
determine a genus and each species of the corresponding product and the one or more other brands of the first product;
when the brick and mortar store sells the corresponding product, determine whether a price difference exists between the competing store for the first product and the brick and mortar store for the each species of a same genus of the corresponding product;
when the brick and mortar store sells the one or more other brands of the first product, determine whether a price difference exists between the competing store for the first product and the brick and mortar store for the one or more other brands of the first product;
when the brick and mortar store sells the corresponding product or the one or more other brands of the first product, determine whether the genus or the each species of the corresponding product or the one or more other brands of the first product is of greater significance to the customer by (a) using the customer purchase data for the corresponding product and the one or more other brands of the first product and (b) comparing product purchases of the first product on the receipt made by the customer at the competing store with product purchases of the corresponding product or the one or more other brands of the first product made by the customer at the brick and mortar store;
when the brick and mortar store sells the corresponding product or the one or more other brands of the first product, compare the first product with the corresponding product or the one or more other brands of the first product to determine that the first product was purchased by the customer at the competing store for a lower price than a price at which at least one of the corresponding product or the one or more other brands of the first product is sold by the brick and mortar store,
when the first product was purchased by the customer at the competing store at the lower price, prepare a coupon based on a determination of whether the genus of the each species of the corresponding product or the one or more other brands of the first product is of greater significance to the customer, the coupon offering the customer a discount for shopping at the brick and mortar store which is equal to a price difference between the price at which the first product was purchased by the customer at the competing store and the price at which the at least one of the corresponding product or the one or more other brands of the first product is sold at the brick and mortar store; and
format the coupon into a notification, wherein the coupon includes a machine-readable code; and
create a second coupon based on the customer purchase data from prior purchases at the competing store specific to the customer, wherein the second coupon is formatted into a second notification, wherein the second coupon includes a machine-readable code;
transmitting the notification by the computer server over a wireless communication channel to the customer computer, wherein the notification comprises a pop-up window;

generating, by the computer server, a user interface of the application for display on the customer computer, the user interface including the pop-up window;

displaying the coupon and the second coupon to the customer on the user interface; and scanning, by the scanner, the machine-readable code to allow the customer to redeem the coupon and the second coupon for purchasing the corresponding product or the one or more other brands of the first product at the brick and mortar store and to adjust the price of the corresponding product or the one or more other brands of the first product at the brick and mortar store by the coupon.

9. The method of claim 8, wherein use the first product description associated with the first UPC code of the first product to query the product database to identify the one or more other brands of the first product further comprises:

querying the product database for the products matching the genus of the first product, and identifying one or more products matching the genus of the first product but having a different species than a species of the first product.

10. The method of claim 9, wherein the genus of the first product is a type of the first product.

11. The method of claim 9, wherein the species of the product is a brand of the first product.

12. The method of claim 9, wherein the species of the first product is a brand of the first product and one or more characteristics associated with the first product.

13. The method of claim 9, wherein the species of the one or more other products is one or more brands of one or more first products, and one or more characteristics associated with each of the one or more first products.

14. The method of claim 8, further comprises providing an invitation to the customer to create an account with the brick and mortar store.

15. A computer system comprising:

a computer server associated with a brick and mortar store;

at least one sales system located at the brick and mortar store and communicatively coupled to the computer server and programmed to transmit a notification to an application stored on a mobile device, the notification inviting a customer to upload an image of a receipt from a competing store;

a scanner located within the brick and mortar store and communicatively coupled to the at least one sales system;

the application configured to:

upload a receipt image from the competing store, wherein the image of the receipt includes receipt data, and transmit the receipt image including the receipt data to the at least one sales system, the at least one sales system further comprising:

one or more processors, one or more non-transitory memory devices operably connected to the one or more processors, the one or more non-transitory memory devices collectively storing:

a price matching module being programmed to:

electronically receive the receipt image from the mobile device;

process the receipt image using optical character recognition;

identify a first UPC code of a plurality of UPC codes associated with a first product on the receipt to thereby identify the first product on the receipt image that was purchased by the customer at the competing store;

query a product database to identify a corresponding product sold by the brick and mortar store associated with the first UPC code associated with the first product on the receipt, wherein the product database stores a plurality of product information for products sold at the brick and mortar store comprising the plurality of UPC codes, a plurality of product descriptions, and customer purchase data for each of the plurality of UPC codes;

identify, from the receipt data, a price at which the first product was purchased at the competing store;

compare at least the first product, the price, and the first UPC code to the product database to determine whether the corresponding product is sold by the brick and mortar store and whether the one or more other brands of the first product is sold by the brick and mortar store;

when the corresponding product is not sold by the brick and mortar store, use a first product description of the plurality of product descriptions associated with the first UPC code of the first product to query the product database to identify the one or more other brands of the first product sold by the brick and mortar store;

analyze the first product description associated with the first UPC code of the first product to determine whether the brick and mortar store sells the one or more other brands of the first product, wherein the one or more other brands of the first product has a UPC code distinct from the first UPC code of the first product;

determine a genus and each species of the corresponding product and the one or more other brands of the first product;

when the brick and mortar store sells the corresponding product, determine whether a price difference exists between the brick and mortar store for the first product and the competing store for the each species of a same genus of the corresponding product;

when the brick and mortar store sells the one or more other brands of the first product, determine whether a price difference exists between the competing store for the first product and the brick and mortar store for the one or more other brands of the first product;

when the brick and mortar store sells the corresponding product or the one or more other brands of the first product, determine whether the genus or the each species of the corresponding product or the one or more other brands of the first product is of greater significance to the customer by (a) using the customer purchase data for the corresponding product and the one or more other brands of the first product and (b) comparing product purchases of the first product on the receipt made by the customer at the competing store with product purchases of the corresponding product or the one or more other brands of the first product made by the customer at the brick and mortar store;

when the brick and mortar store sells the corresponding product or the one or more other brands of the first product, compare the first product with the corresponding product or the one or more other brands of the first product to determine that the first product was purchased by the customer at the competing store for a lower price than a price at which at least one of the corresponding product or the one or more other brands of the first product is sold by the brick and mortar store, when the first product was purchased by the customer at the competing store at the lower price, prepare a personalized coupon based on the determination of whether the genus of the each species of the corresponding product or the one or more other brands of the first product is of greater significance to the customer, the personalized coupon offering the customer a discount for shopping at the brick and mortar store which is equal to a price difference between the price at which the first product was purchased by the customer at the competing store and the price at which the at least one of the corresponding product or the one or more other brands of the first product is sold at the brick and mortar store; and format the personalized coupon into the notification, wherein the personalized coupon includes a machine-readable code;

create a second coupon based on the customer purchase data from prior purchases at the competing store specific to the customer, wherein the second coupon is formatted into a second notification, wherein the second coupon includes a second machine-readable code;

transmit the notification to the mobile device, wherein the notification comprises a pop-up window; and the computer server further configured to generate a user interface of the application for display on the mobile device, the user interface including the pop-up window; and the application further configured to:
receive the personalized coupon and the second coupon from the computer server; and
display the personalized coupon and the second coupon to the customer on the user interface, wherein the scanner is configured to scan the machine-readable code to allow the customer to redeem the coupon and the second coupon for purchasing the corresponding product or the one or more other brands of the first product at the brick and mortar store and to adjust the price of the corresponding product or the one or more other brands of the first product at the brick and mortar store by the personalized coupon.

16. The system of claim 15, wherein use the product description associated with the first UPC code of the first product to query the product database to identify the one or more other brands of the first product further comprises:
querying the product database for the products matching the genus of the first product, and
identifying one or more products matching the genus of the first product but having a different species than a species of the first product.

17. The system of claim 16, wherein the genus of the first product is a type of the first product.

18. The system of claim 16, wherein the species of the first product is a brand of the first product.

19. The system of claim 16, wherein the species of the first product is a brand of the first product and one or more characteristics associated with the first product.

20. The system of claim 16, wherein the species of one or more products is one or more brands of one or more first products, and one or more characteristics associated with each of the one or more first products.

* * * * *